United States Patent
Tarafder

(10) Patent No.: US 11,143,633 B2
(45) Date of Patent: *Oct. 12, 2021

(54) SYSTEMS, METHODS AND DEVICES FOR DECREASING SOLUBILITY PROBLEMS IN CHROMATOGRAPHY

(71) Applicant: Waters Technologies Corporation, Milford, MA (US)

(72) Inventor: Abhijit Tarafder, Franklin, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 477 days.

This patent is subject to a terminal disclaimer.

(21) Appl. No.: 15/769,215

(22) PCT Filed: Oct. 19, 2016

(86) PCT No.: PCT/US2016/057616
§ 371 (c)(1),
(2) Date: Apr. 18, 2018

(87) PCT Pub. No.: WO2017/070156
PCT Pub. Date: Apr. 27, 2017

(65) Prior Publication Data
US 2018/0306757 A1    Oct. 25, 2018

Related U.S. Application Data

(60) Provisional application No. 62/243,774, filed on Oct. 20, 2015.

(51) Int. Cl.
*G01N 30/06* (2006.01)
*G01N 30/20* (2006.01)
(Continued)

(52) U.S. Cl.
CPC ........... *G01N 30/06* (2013.01); *G01N 30/20* (2013.01); *G01N 30/88* (2013.01); *B01D 15/12* (2013.01);
(Continued)

(58) Field of Classification Search
None
See application file for complete search history.

(56) References Cited

U.S. PATENT DOCUMENTS

| 3,504,799 A | 4/1970 | Ogle |
| 4,836,038 A | 6/1989 | Baldwyn |

(Continued)

FOREIGN PATENT DOCUMENTS

| WO | 2011106162 A1 | 9/2011 |
| WO | 2013187916 A1 | 12/2013 |

(Continued)

OTHER PUBLICATIONS

Extended European Search Report issued in European Application No. 16858096.7 dated May 24, 2019.

(Continued)

*Primary Examiner* — Jill E Culler
(74) *Attorney, Agent, or Firm* — Womble Bond Dickinson (US) LLP; Deborah M. Vernon; Benedict L. Hanrahan

(57) ABSTRACT

A significant reduction in extra-column band broadening can be achieved by decoupling the injection system from the main solvent flow line. In addition, by decoupling the injection system from the main solvent flow line, additional components (e.g., filters, valves, etc.) can be introduced into the chromatography system without increasing the negative band broadening effects. Systems and methods herein provide not only for such decoupling but also for filtering precipitates from the system. As a result, a larger volume of sample can be injected into the present systems without (Continued)

compromising separation yield. In addition, an increase the column loading per batch, an increase the overall yield of separations, and greater system efficiency (i.e., less time lost for cleaning and maintenance) can be realized.

12 Claims, 10 Drawing Sheets

(51) Int. Cl.
  *G01N 30/88* (2006.01)
  *B01D 15/12* (2006.01)
  *B01D 15/14* (2006.01)
(52) U.S. Cl.
  CPC ............ *B01D 15/125* (2013.01); *B01D 15/14* (2013.01); *G01N 2030/207* (2013.01)

(56) References Cited

U.S. PATENT DOCUMENTS

| | | | |
|---|---|---|---|
| 5,105,851 A * | 4/1992 | Fogelman | F16K 11/083 137/625.11 |
| 2004/0035183 A1 | 2/2004 | O'Brien et al. | |
| 2006/0054543 A1 | 3/2006 | Petro et al. | |
| 2007/0277596 A1 | 12/2007 | Kim et al. | |
| 2011/0016955 A1 * | 1/2011 | Cormier | G01N 1/38 73/61.55 |
| 2012/0305464 A1 * | 12/2012 | Cormier | G01N 30/20 210/198.2 |
| 2014/0061133 A1 | 3/2014 | Herman | |
| 2014/0299765 A1 | 10/2014 | Di Bussolo et al. | |
| 2014/0306105 A1 * | 10/2014 | Netto | G01N 30/462 250/282 |
| 2015/0316516 A1 * | 11/2015 | Albrecht, Jr. | G01N 30/20 73/61.56 |
| 2015/0377843 A1 | 12/2015 | Morikawa et al. | |

FOREIGN PATENT DOCUMENTS

| | | |
|---|---|---|
| WO | 2014085003 A2 | 6/2014 |
| WO | 2014/132687 A1 | 9/2014 |

OTHER PUBLICATIONS

International Search Report and Written Opinion for International Patent Application No. PCT/US2016/057616, dated Dec. 9, 2016 and dated Jan. 17, 2017.

* cited by examiner

Starting

Pressurizing and Separating

SYSTEMS, METHODS AND DEVICES FOR DECREASING SOLUBILITY PROBLEMS IN CHROMATOGRAPHY

CROSS-REFERENCE TO RELATED APPLICATIONS

This application is a National Stage Application of International Application No. PCT/US2016/057616, filed Oct. 19, 2016, which claims priority to U.S. Provisional Application No. 62/243,774, filed Oct. 20, 2015, and entitled "Systems, Methods and Devices for Decreasing Solubility Problems in Chromatography." Each of the foregoing applications is incorporated herein by reference in its entirety.

FIELD OF THE INVENTION

The present invention generally relates to chromatography systems, and in particular, systems, methods and devices for reducing extra-column band broadening and solubility problems (i.e., precipitation) in highly-compressible fluid chromatography (e.g., $CO_2$-based chromatography).

BACKGROUND

Highly-compressible fluid chromatography is a type of chromatography that is configured to operate with a solvent that includes a fluid (e.g., carbon dioxide, Freon, etc.) that is in a gaseous state at ambient/room temperature and pressure. Typically, highly-compressible fluid chromatography involves a fluid that experiences noticeable density changes over small changes in pressure and temperature. Although highly-compressible fluid chromatography can be carried out with several different compounds, in the current document $CO_2$ will be used as the reference compound as it is currently the most commonly employed. (It is noted that highly-compressible fluid chromatography has also been referred to as $CO_2$-based chromatography, or in some instances as supercritical fluid chromatography (SFC), especially where $CO_2$ is used as the mobile phase. It is also noted that, in this application, mobile phase is used as a term to describe the primary source of a combined flow stream flowing through a chromatography column. For example, in a separation in which CO2 and methanol (a co-solvent) are mixed together to create a combined flow stream passing through a chromatography column, the term mobile phase will refer to the CO2 and the methanol will be referred to as a co-solvent.)

Highly-compressible fluid chromatography combines many of the features of liquid chromatography (LC) and gas chromatography (GC), and can often be used for separations with compounds that are not suitable either for LC or GC. For example, $CO_2$-based chromatography can be advantageous for separation and analysis of hydrophilic and chiral compounds, lipids, thermally-labile compounds and polymers. Other advantages include the lower cost and toxicity of the mobile phase, when using $CO_2$ as a solvent, compared to many liquid mobile phases typically used in LC.

In addition to carbon dioxide, the mobile phase fluid typically contains a liquid organic co-solvent mixed together with the carbon dioxide. A common co-solvent is methanol. Examples of other co-solvents include acetonitrile and alcohols such as ethanol and isopropanol. The carbon dioxide based mobile phase (including any co-solvent) is maintained at a pressure and temperature where the mobile phase remains as a homogeneous, single phase. To do so, systems must be able to provide and maintain tight control over temperature, pressure, etc.

Two of the factors that influence the separation power of any chromatographic system are the separation factor or selectivity of the separation media and the efficiency of the system. The efficiency of a chromatography system is affected by the band broadening or band dispersion produced by the system. The terms "band broadening" and "band dispersion" are used interchangeably herein. Higher selectivity provides improved separation. Brand broadening negatively affects separation. As a result, a reduction in band broadening will improve the separation power of an instrument.

Extra-column band broadening (i.e., band broadening contributed to system components lying outside of the column) can occur in a chromatography system due to various factors. For example, upstream of the column, dispersion can occur after the band leaves the injector, while it is traveling towards the column inlet. An ideal sample leaves the injector as a rectangular band 10 in a conduit 12, e.g., as shown in FIG. 1A. After the sample band leaves the injector, the band is transported from the injector to the column inlet. The diffusivity of analytes in the mobile phase controls dispersion while the band travels along the tubing connecting the injector to the column inlet. For example, FIG. 1B illustrates a diffused sample band 14 in a conduit 12. Analyte diffusivity in typical SFC solvents, such as $CO_2$, is significantly greater than in the solvents used in conventional LC, which could result in a diffused band at the column inlet. Another factor that can affect dispersion inside the column is a mismatch between the composition of the sample solvent and the mobile phase. For example, severe band distortion leading to separation loss can take place if a sample is prepared in a solvent having a composition markedly different than the composition of the mobile phase. (See, for example, Mishra M, Rana C, De Wit A, Martin M., Influence of a strong sample solvent on analyte dispersion in chromatographic columns, J Chromatogr A. 2013 Jul. 5; 1297:46-55.) Another factor that can lead to band broadening is additional volume to a system outside the column, i.e., adding multiple fluidic lines, components (e.g., mixers) or connectors.

In conventional $CO_2$-based chromatography preparative systems, there are two commonly used techniques for injecting sample/feed solution into the mobile stream. (See, for example, Arvind Rajendran, Design of preparative supercritical fluid chromatography, J Chromatogr. A., 2012 Jun. 7; 1250:227-249.) The first conventional technique (illustrated in FIG. 2), which is also commonly used in HPLC, injects the feed solution directly into the $CO_2$ plus co-solvent/modifier mixture. That is, the feed solution is injected into the main mobile phase fluid line after mixing the $CO_2$ and co-solvent together but before the column. This technique, however, can lead to significant distortion of the chromatographic band even when injecting moderate volume of the feed solution. This is because the solvent used to prepare the feed solution can only be the modifier, leading to significant mismatch in feed solvent versus mobile phase composition. The second technique (illustrated in FIG. 3), which is used to address mismatch, is to inject the sample directly into the modifier before the modifier is mixed with the $CO_2$. This technique has some limitations due to problems associated with mixing of the sample/feed solution with co-solvent. That is, the mixing process can significantly distort the feed band profile, resulting in extra-column band dispersion. And this can lead to overlapping peaks inside the column resulting in yield loss, especially if the target compound(s) have closely eluting impurities.

Further problems plague conventional systems. For example, the mismatch in feed solvents versus mobile phase composition also creates solubility problems. In particular, the mismatch generally results in precipitation of the sample on system parts, such as frits. Due to the sensitive pressure and temperature controls over these systems, precipitation on system parts deteriorates system performance, and can even result in solute crashing of the system requiring the shut-down, disassembly and cleaning of the entire system. To avoid such laborious tasks as system shut-down, operators run the systems far below solubility limits of the feed solvent in the mobile phase, which decreases productivity and the capabilities of the separations.

Another approach to address solubility problems is to provide an extraction injection device. Such a system, as shown in FIG. 4, uses an extraction vessel connected to the co-solvent and mobile phase pumps to allow for solubilizing the feed/sample material inside the extraction vessel. Once solubilized, the extraction vessel is used for injection into the chromatography system. While this method reduces the amount of precipitation, operators have less control over feed injection (e.g., varying injection amounts) as there is limited control over the flow from the extraction vessel.

Accordingly, there remains a need for sample injection mechanisms that reduce extra-column band broadening.

SUMMARY

A significant reduction in extra-column band broadening can be achieved by decoupling the injection system from the main solvent flow line. Systems and methods for such decoupling can allow for the injection of larger volumes of sample without compromising separation yield, increase the column loading per batch, and increase the overall yield of separations. That is, by removing (e.g., decoupling) sample injection from the main mobile phase flow line, extra-column band dispersion is reduced. The sample can be injected with the use of an additional flow line eliminating undesirable constraints on sample size. While adding extra volume to a highly-compressible fluid chromatography system is typically avoided in the art, the inventors have surprisingly found that by decoupling column loading and column injection by having dedicated flow lines, extra-column band broadening can be reduced.

In addition to decoupling of the injection system from the main solvent lines, a filter (i.e., strainer) is used within the decoupled injector line to remove precipitates to prevent system failure while at the same time allowing for higher concentrations of feed/sample to be utilized. That is, the filter not only protects the system from damaging precipitates, but also allows for increased system performance by enabling the system to be functional at higher concentrations of feed/sample. For example, in conventional systems which lack the combination of a cross-stream injection (e.g., decoupling of the injection line from the solvent line) and a filter, operators are typically limited to a range of feed concentration which is generally at or below about 60% (e.g., at or below 50%) of the solubility limit of the feed material in the mobile phase. In the systems and methods of the present disclosure, such limitations are no longer necessary. An operator can proceed at or below 100% of the solubility limit. As a result, greater flexibility of operating conditions can be utilized and more efficient and effective separations can be accomplished than in conventional systems.

One aspect provides a chromatography system including a first co-solvent source in fluid communication with a first mixer; a second co-solvent source and a sample source in fluid communication with a second mixer; a mobile phase source configured to provide mobile phase to the first and second mixers, a strainer to minimize precipitation of sample in mobile phase, a sample loop positioned downstream and in fluid communication with the strainer, a chromatography column and a valve. In some embodiments, the second co-solvent source and the sample source are combined to form a feed solution. That is, the second co-solvent source and the sample source are provided as a co-solvent and a sample dissolved in the co-solvent. The valve has, i.e., can be disposed in, a plurality of discrete positions forming different fluidic connections. In exemplary embodiments, the plurality of discrete positions can include a first position in which the first mixer is in fluid communication with the chromatography column and the second mixer is in fluid communication with the sample loop and a second position in which the first mixer is in fluid communication the sample loop and the sample loop is in fluid communication with the chromatography column.

In exemplary embodiments, the strainer (i.e., filter) comprises an inner vessel (e.g., inner cylinder) and an outer cylinder. The inner vessel can be formed of a filtration material to decrease the flow of particulates to the outer cylinder. The inner vessel can be a frit tube. In some embodiments, the second mixer and the strainer are combined into an integral device. In other embodiments, the second mixer and strainer are distinct components. Certain embodiments of the present technology further include a strainer monitoring system, which detects clogs or conditions which indicate a clog has occurred or could possibly be forming. In some embodiments, the strainer monitoring system includes a turbidity check mechanism. In some embodiments, the strainer monitoring system includes a pressure monitor. A rise in expected pressure, in some instances, can indicate the presence of a clogging event. Some embodiments of the present technology include a regeneration system. The regeneration system allows for recycling of feed material caught within the strainer. Certain embodiments feature mixers and/or valves for delivery of co-solvent to dilute feed material contained within the strainer.

Another aspect of the present technology provides a method of increasing solubility of a sample in a chromatographic mixed solution. The method includes (a) pressurizing a first flow path through a valve to a chromatography column with a first mixture of mobile phase and co-solvent; (b) pressurizing and filtering a second flow path through the valve to a sample loop with a second mixture (the second mixture including mobile phase, co-solvent and the sample); and (c) actuating the valve to introduce the second mixture of mobile phase and co-solvent in the sample loop into the chromatography column.

In some embodiments further include monitoring for filter/strainer failure or decreased performance. For example, in some exemplary embodiments, monitoring includes performing a turbidity check. In certain exemplary embodiments, monitoring includes looking for or detecting a rise in pressure in a co-solvent pump. Once a filter failure or decreased filter performance is detected, the method can further include activating a by-pass of the second flow path. Some embodiments further include regeneration of a clogged filter/strainer. During regeneration, sample removed from the filter/strainer can be dissolved and recycled.

In exemplary embodiments of the above aspects, the mobile phase can be $CO_2$. In some embodiments, the $CO_2$ can be in a supercritical state or subcritical state. The co-solvent can be a polar or non-polar organic solvent selected from the group consisting of but not limited to methanol, ethanol or isopropanol, acetonitrile, acetone, tetrahydrofuran, and mixtures thereof (including mixtures of water and any of these solvents). Some embodiments can include a gas liquid separator, wherein the second fluid delivery system, the second co-solvent source, or the second mixture of mobile phase and co-solvent is in fluid communication with the gas liquid separator through the valve in one or both of the first and second valve positions.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1A:
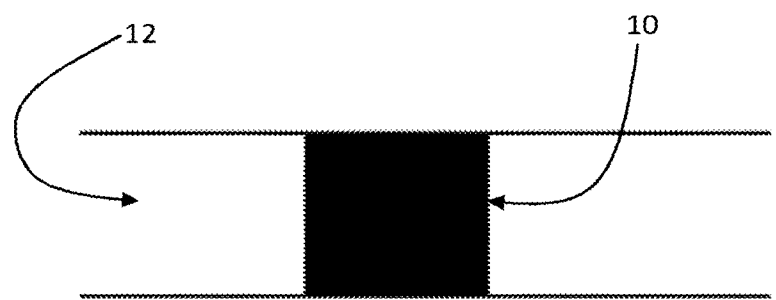
FIG. 1A illustrates a ideal sample band.
Figure 1B:
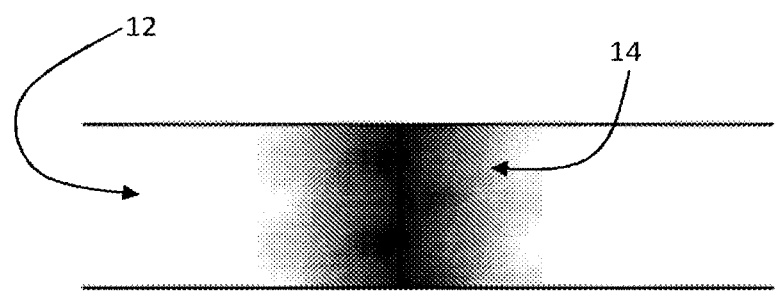
FIG. 1B illustrates a diffused sample band.
Figure 2:
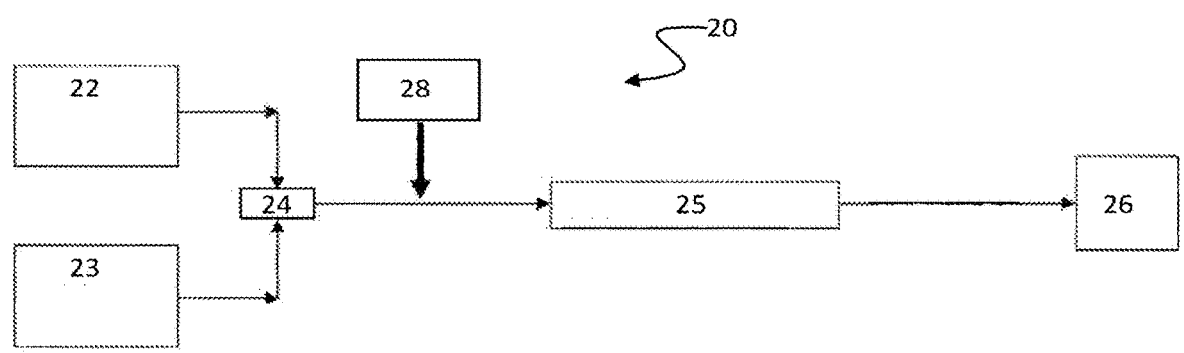
FIG. 2 schematically illustrates a prior art method of sample injection.

FIG. 2 illustrates one system for injecting sample solution into a mobile phase stream. FIG. 2 schematically illustrates a chromatography system 20 including a mobile phase source 22, a co-solvent source 23, a mixing connector 24, and a chromatography column 25. The mobile phase source 22 supplies mobile phase, e.g., $CO_2$ and the co-solvent source 23 supplies a co-solvent, e.g., methanol, to the mixing connector 24. The mixing connector 24 mixes the co-solvent and mobile phase. The co-solvent and mobile phase mixture then passes from the mixing connector 24 to a chromatography column 25. After passing through the chromatography column 25, the mixture of mobile phase and co-solvent flows to a detector 26. As shown in FIG. 2, the method includes injecting a feed solution 28 including solvent and sample directly into the mobile phase and co-solvent mixture after the mixing connector 24. This method can lead to significant distortion of the chromatographic band even when injecting moderate volume of the feed solution because the solvent used to prepare the feed solution may not be the same as the composition of the mobile phase, which results in a mismatch between the feed solvent and the mobile phase composition. In $CO_2$-based or other highly-compressible fluid chromatography, this mismatch is inevitable because the mobile phase is a mixture of compressible $CO_2$ and liquid organic co-solvent, but the sample is prepared in a liquid solvent. If the eluting strength of the sample solvent is greater than that of the mobile phase, a deformation of the analyte zone occurs because its frontal part moves at a relatively high velocity due to a low retention factor in the sample solvent while the rear part of the analyte zone is more retained in the mobile phase liquid and hence moves at a lower velocity.

Figure 3:
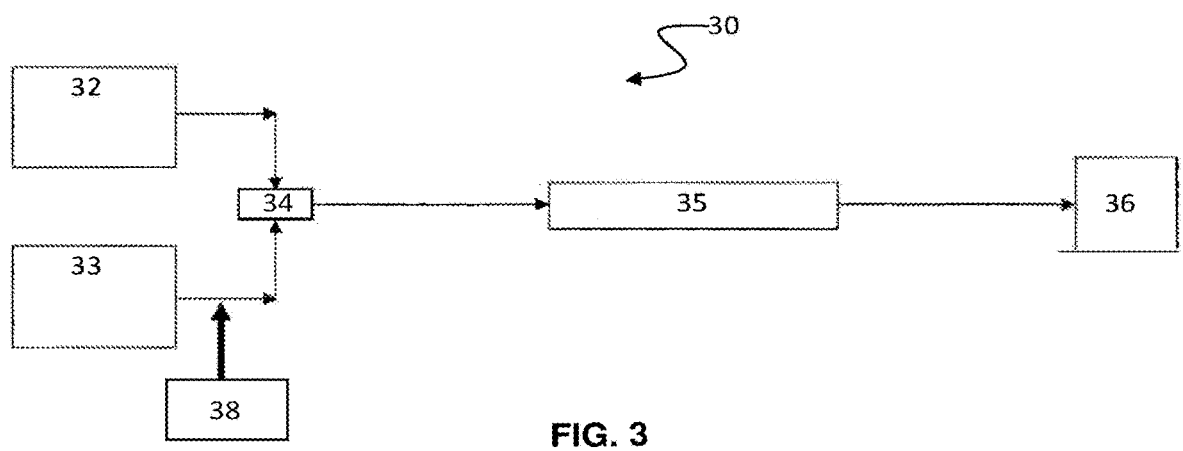
FIG. 3 schematically illustrates another prior art method of sample injection.

FIG. 3 illustrates another injection system for injecting sample solution into the mobile phase stream. FIG. 3 schematically illustrates a chromatography system 30 including a mobile phase source 32, a co-solvent source 33, a mixing connector 34, and a chromatography column 35. The mobile phase source 32 supplies mobile phase, e.g., $CO_2$ and the co-solvent source 33 supplies a co-solvent, e.g., methanol, to the mixing connector 34. The mixing connector 34 mixes the co-solvent and mobile phase. The co-solvent and mobile phase mixture then passes from the mixing connector 34 to a chromatography column 35. After passing through the chromatography column 35, the mobile phase/co-solvent flows to a detector 36. As shown in FIG. 3, the method includes injecting the sample 38 directly into the co-solvent stream from the co-solvent source 33 before mixing the co-solvent with the mobile phase. Injecting the sample directly into the co-solvent stream alleviates the mismatch between the feed solution and the mobile phase composition, allowing larger sample volume to be injected into the system for separation. However, this injection mechanism has other limitations, especially when separating closely eluting components. For example, problems can arise because the co-solvent and sample are mixed with the mobile phase after the sample is introduced into the system. The mixing process can significantly disperse the sample band, resulting in high extra-column band dispersion. This, in turn, can lead to peak overlapping inside the column resulting into yield loss, especially if the target compound(s) have closely eluting impurities. Another problem related to this injection mechanism is the dependence of the mass of sample injected per injection, on the co-solvent composition. If the co-solvent percent is low in the modifier stream, either one has to accept lower mass injection into the system or longer injection time—both of which leads to loss of productivity and separation performance.

Further problems plague conventional systems. For example, the mismatch in feed solvents versus mobile phase composition (i.e., the flow stream containing $CO_2$ and any co-solvent) also creates solubility problems. In particular, the mismatch can lead to precipitation of the sample on system parts, such as frits, if, for example, the feed solubility in the mobile phase is decreased as compared to the feed in co-solvent. Due to the sensitivity of pressure and temperature controls over these systems, precipitation on system parts deteriorates system performance, and can even result in solute crashing of the system requiring the shut-down, disassembly and cleaning of the entire system. To avoid such laborious tasks as system shut-down, operators run the systems far below solubility limits of the feed solvent in the mobile phase, which decreases productivity and the capabilities of the separations.

Figure 4A:
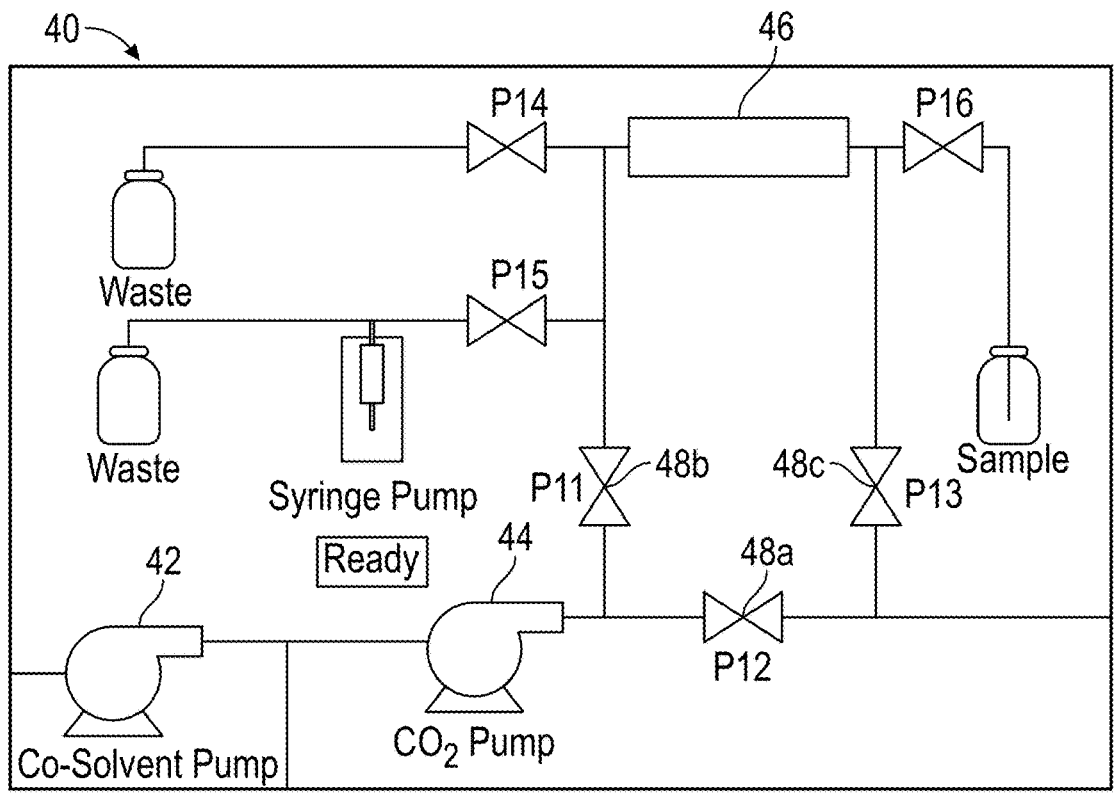
FIGS. 4A, 4B, and 4C schematically illustrate a prior art method of addressing solubility problems during sample injection.
Figure 4B:
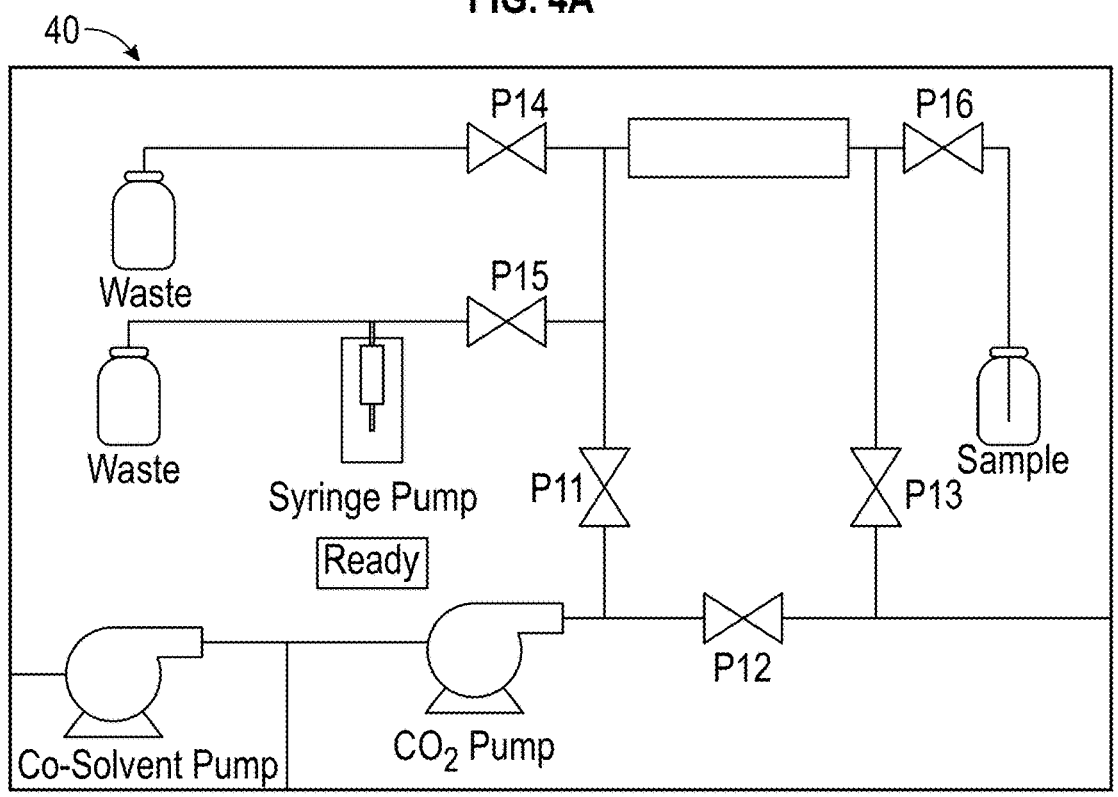
Figure 4C:
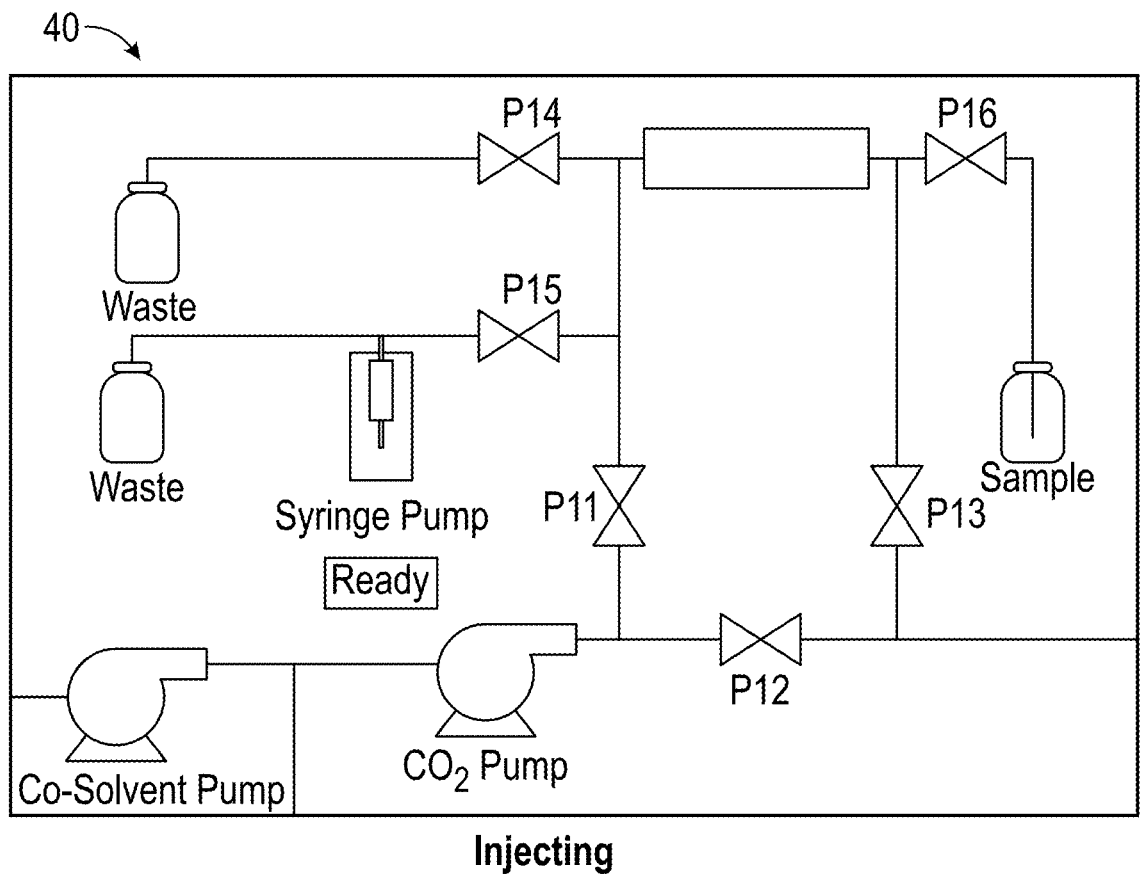

To address such issues, an extraction vessel including the sample to be introduced into the system have been utilized. FIGS. 4A-4C, show a method of operating system 40 that includes the use of a co-solvent pump 42 and mobile phase ($CO_2$) pump 44 for generating a mixed phase flow stream. A sample is introduced into the mixed phase flow stream via extraction vessel 46. A series of valves (48a, 48b, and 48c) are opened/closed to create conditions in which the method is initiated (mixed phase flow is provided to a column). The initiation or starting position is shown in FIG. 4A, in which valve 48A is opened and valves 48B and 48C are closed. To extract the sample from extraction vessel 46, the method includes a pressurizing and separating step shown in FIG. 4B, in which valve 48B is opened and valve 48A remains open. In a final injection step, shown in FIG. 4C, valve 48A is closed and valve 48C is opened to inject the separated sample from the extraction vessel 46 into the column. While this method reduces the amount of precipitation, operators have less control over feed injection (e.g., varying injection amounts) as there is limited control over the flow from the extraction vessel.

In exemplary embodiments, a significant reduction in extra-column band broadening can be achieved by decoupling the injection system from the main solvent flow line. Solubility issues have been addressed in the present technology by incorporating a filter or filtering/recycling system into the decoupled injection system. Systems and methods for such decoupling and filtering of the feed solution used in the injection line can allow for the injection of larger volumes of sample without compromising separation yield, increase the column loading per batch, and increase the overall yield of separations. For example, a mixture of co-solvent and sample can be prepared separately from the main flow of mobile phase and co-solvent, loaded onto an injection loop, and then injected directly into the main flow of mobile phase and co-solvent just before the chromatography column. In addition, by incorporating a filtering step, solubility of the feed solution can be increased without compromising productivity (i.e., without crashing the system due to precipitate build up).

Figure 5A:
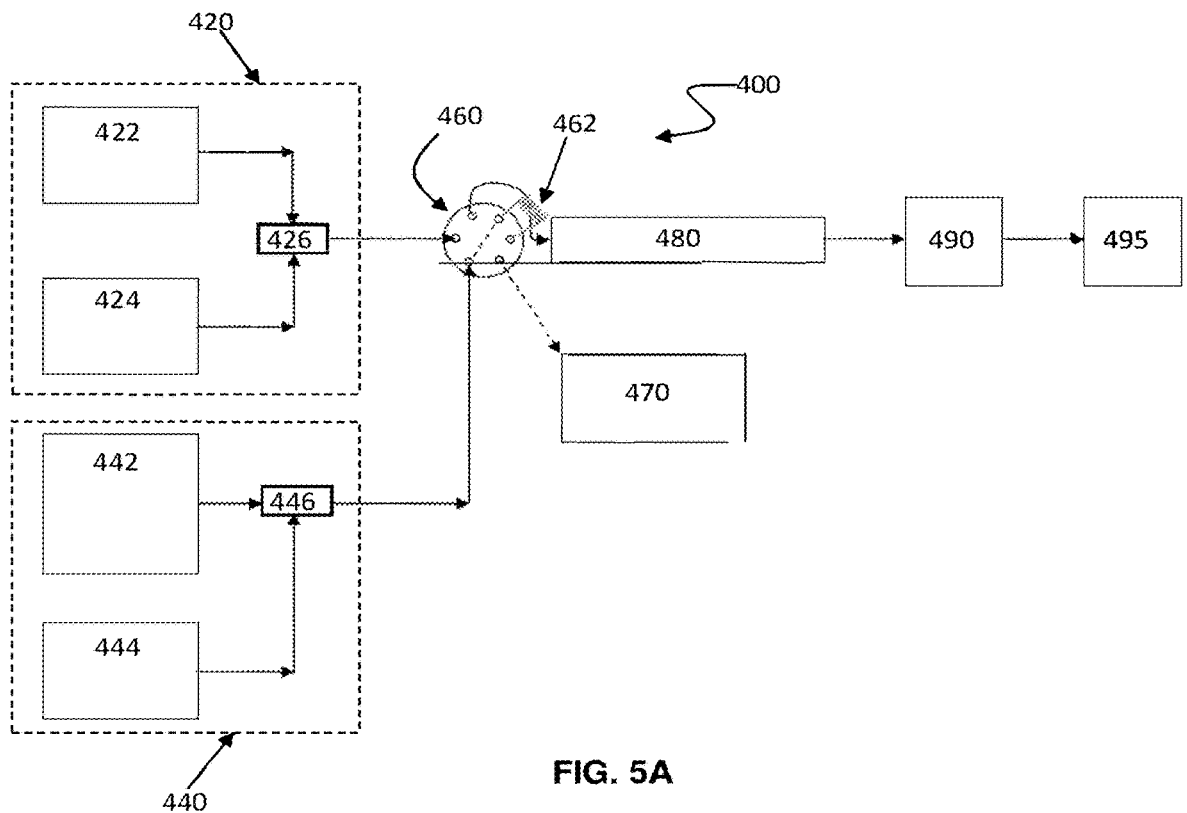
FIG. 5A schematically illustrates a sample injection system according to an embodiment of the present technology.

FIG. 5A illustrates an exemplary chromatography system 400. For simplicity sake, the embodiment shown in FIG. 5A lacks a filter/strainer or filtering system. Systems and methods which incorporate the filter/filtering system will be described below. The system 400 includes a first fluid delivery system 420, a second fluid delivery system 440, a valve 460, and a chromatography column 480. The valve 460 can include or be in fluid communication with a sample loop 462. In some embodiments, a detector 490 and a back pressure regulator 495 can be downstream of the column 480.

In exemplary embodiments, the first fluid delivery system 420 can include a first co-solvent source 422, a first mobile phase source 424, and a first mixing connector 426 (e.g., a mixer). The second fluid delivery system 440 can include a second co-solvent source 442, a second mobile phase source 444, and a second mixing connector 446. The second co-solvent source 442 can be the sample source. For example, the second co-solvent source can provide co-solvent and a sample dissolved in the co-solvent. The relative concentrations of co-solvent and mobile phase provided by the first fluid delivery system 420 can be the same as the relative concentrations of co-solvent and mobile phase provided by the second fluid delivery system 440. In other embodiments, the relative concentrations of co-solvent and mobile phase provided by the first fluid delivery system 420 can be different from the relative concentrations of co-solvent and mobile phase provided by the second fluid delivery system 440. By decoupling the second fluid delivery system 440 from the first fluid delivery system 420, an operator has a multitude of concentration possibilities. That is, one is no longer constrained by the co-solvent concentration selected or required for conditioning a column for separation. Numerous possibilities regarding co-solvent concentration are now possible. For example, the concentration of co-solvent provided by the second fluid delivery system 440 can be higher than the concentration of co-solvent provided by the first fluid delivery system 420. In some embodiments, the relative concentrations of co-solvent and mobile phase provided by one or both of the first fluid delivery system 420 and the second fluid delivery system 440 can be variable over an elution period or fraction thereof (e.g., gradient mode).

In the embodiments in which the sample is included in the second co-solvent source 442, the first fluid delivery system 420 can also be referred to or considered the solvent system line or the main solvent flow line, whereas the second fluid delivery system, represented by box 440, is the injection flow line or feed solvent line.

The valve 460 can be a multi-port rotary shear seal valve having a plurality of fluidic ports and one or more flow-through conduits. Although described primarily as a rotary valve, other types of suitable valves can also be used including, but not limited to, slider valves, solenoids, and pin valves. Each flow-through conduit provides a pathway between a pair of neighboring fluidic ports. When the valve rotates, its flow-through conduits move clockwise or counterclockwise, depending upon the valve's direction of rotation. This movement operates to switch the flow-through conduit to a different of neighboring fluidic ports, establishing a fluidic pathway between that different pair while removing the pathway from the previously connected pair of fluidic ports.

The valve 460 can be placed in a plurality of discrete positions. For example, those positions can include a first position corresponding to a LOAD state of the valve and a second position corresponding to an INJECT state of the valve. In the LOAD state, the first fluid delivery system 420 is in fluid communication with the chromatography column 480 while the second fluid delivery system 440 is in fluid communication with the sample loop 462. In the INJECT state, the first fluid delivery system 420 is in fluid communication the sample loop 462 and the sample loop 462 is in fluid communication with the chromatography column 480.

When in the LOAD state, the first fluid delivery system can deliver mobile phase or a mixture of mobile phase and a co-solvent to the column. In such embodiments, the first fluid delivery system can include a first co-solvent source 422 and a first mobile phase source 424. When in the LOAD state, the second fluid delivery system 440 can deliver co-solvent or a mixture of co-solvent and a sample dissolved therein to the sample loop 462. In some embodiments, the second fluid delivery 440 can provide flow to the sample loop 462 until a pre-set pressure in the sample loop 462 is reached. For example, the pre-set pressure can be the same as the system pressure of the first fluid delivery system.

In other embodiments, the second fluid delivery system 440 can provide continuous flow through the sample loop 462 in the LOAD state. In such embodiments, the valve 460 can be configured to place the sample loop 462 in communication with a gas/liquid separator 470 in the LOAD state. The gas/liquid separator is configured to separate the co-solvent or mixture of co-solvent and sample from the mobile phase, e.g., $CO_2$. In such embodiments, the gas liquid separator 470 can be in fluid communication with the second fluid delivery system 440, e.g., with the second co-solvent source 442. In other embodiments, flow from the second fluid delivery system 440 through the sample loop 462 can pass to a waste container. While FIG. 4, shows a gas/liquid separator 470 connected to valve 460, other types of recycling mechanisms known in the art can be substituted for the gas/liquid separator to capture and recycle at least a portion of the mobile phase.

When in the INJECT state, the first fluid delivery system 420 delivers mobile phase or a mixture of mobile phase and a co-solvent first through the sample loop and then into the column, injecting the contents of the sample loop onto the column. When in the INJECT state, flow from the second fluid delivery system 440 can be directed to the gas liquid separator 470 (for collection or re-cycling of the sample) or to waste.

In FIG. 5A, the system 400 includes two mobile phase sources, 424 and 444. Mobile phase source 424 provides mobile phase to mixers 426 and mobile phase source 444 provides mobile phase to mixer 446. While this is one way to decouple the co-solvent line from the feed/sample line, others are also possible. For example, the system can be configured such that a single mobile phase source provides mobile phase to two distinct mixers, one in the main solvent line and one mixer in the feed source line. Accordingly, the mobile phase source may be considered to be a single source (e.g., a single tank) or it may comprise two or more separate tanks. The only one bounding condition if the mobile phase source is formed from more than one tank, is that each tank contain the same mobile phase fluid.

Figure 5B:
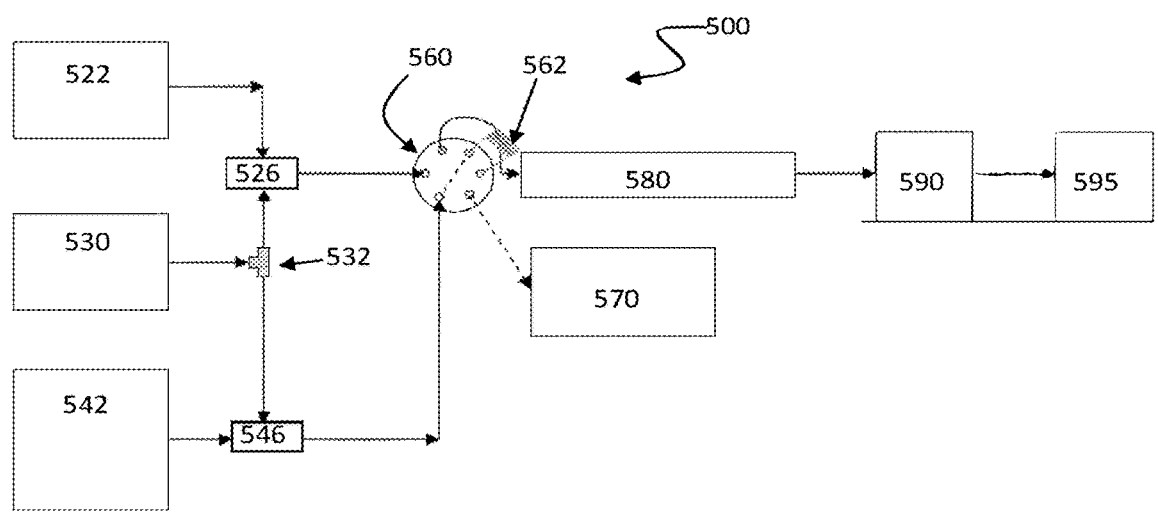
FIG. 5B schematically illustrates another sample injection system according to an embodiment of the present technology.

FIG. 5B illustrates another exemplary chromatography system 500 (also not including a filter or filtering system). The system illustrated in FIG. 5B includes a single mobile phase source 530. The mobile phase source 530 provides mobile phase to a first mixing connector 526 and a second mixing connector 546, e.g., via a flow controller 532. The system 500 includes a first co-solvent source 522, a second co-solvent source 542, a valve 560, and a chromatography column 580. The valve 560 can include or be in fluid communication with a sample loop 562. The first co-solvent source 522 can be in fluid communication with the first mixing connector 526. The second co-solvent source 542 can be in fluid communication with the second mixing connector 546. The relative concentrations of co-solvent and mobile phase provided from the first mixing connector 526 can be the same as the relative concentrations of co-solvent and mobile phase provided from the second mixing connector 546. In other embodiments, the relative concentrations of co-solvent and mobile phase provided from the first mixing connector 526 can be different from the relative concentrations of co-solvent and mobile phase provided from the second mixing connector 546. For example, the concentration of co-solvent provided from the second mixing connector 546 can be higher than the concentration of co-solvent provided from the first mixing connector 526. In some embodiments, the relative concentrations of co-solvent and mobile phase provided from one or both of the first mixing connector 526 and the second mixing connector 546 can be variable over an elution period or fraction thereof.

In exemplary embodiments, the second co-solvent source 542 can be the sample source. For example, the second co-solvent source can provide co-solvent and a sample dissolved in the co-solvent. In certain embodiments the sample can be injected or contained directly into the sample loop 562. In some embodiments, a detector 590 and a back pressure regulator 595 can be downstream of the column 580.

In the embodiments in which the sample is included in the second co-solvent source 542, flow from the first mixing connector 526 can be referred to or considered the solvent system line or the main solvent flow line, whereas the injection flow line or feed system line flows from the second mixing connector 546.

The valve 560 can be a multi-port rotary shear seal valve having a plurality of fluidic ports and one or more flow-through conduits. Although described primarily as a rotary valve, other types of suitable valves can also be used including, but not limited to, slider valves, solenoids, and pin valves. Each flow-through conduit provides a pathway between a pair of neighboring fluidic ports. When the valve rotates, its flow-through conduits move clockwise or counterclockwise, depending upon the valve's direction of rotation. This movement operates to switch the flow-through conduit to a different of neighboring fluidic ports, establishing a fluidic pathway between that different pair while removing the pathway from the previously connected pair of fluidic ports.

The valve 560 can be placed in a plurality of discrete positions. For example, those positions can include a first position corresponding to a LOAD state of the valve and a second position corresponding to an INJECT state of the valve. In the LOAD state, the first mixer 526 is in fluid communication with the chromatography column 580 while the second mixer 546 is in fluid communication with the sample loop 562. In the INJECT state, the first mixer 526 is in fluid communication the sample loop 562 and the sample loop 562 is in fluid communication with the chromatography column 580.

When in the LOAD state, the first mixer 526 can deliver a mixture of mobile phase and co-solvent to the column. In such embodiments, the mobile phase is delivered to the first mixer 526 from the mobile phase source 530 via the flow controller 532 and the co-solvent is delivered to the first mixer 526 from the first co-solvent source 522. When in the LOAD state, the second mixer 546 can deliver a mixture of mobile phase and co-solvent to the sample loop 562. In such embodiments, the mobile phase is delivered to the second mixer 546 from the mobile phase source 530 via the flow controller 532 and the co-solvent is delivered to the second mixer 546 from the second co-solvent source 542. The co-solvent from the second co-solvent source 542 can include a sample dissolved in the co-solvent. In other embodiments, the sample can be preloaded or injected into the sample loop 562. In some embodiments, the flow controller 532 and the second co-solvent source 542 can provide flow to the sample loop 562 until a pre-set pressure in the sample loop 562 is reached. For example, the pre-set pressure can be the same as the system pressure provided by the first co-solvent source 522 and the flow controller 532.

In other embodiments, continuous flow can be provided from the mixer 546 through the sample loop 562 in the LOAD state. In some of these embodiments, the valve 560 can be configured to place the sample loop 562 in communication with a gas/liquid separator 570 in the LOAD state. The gas/liquid separator is configured to separate the co-solvent or mixture of co-solvent and sample from the mobile phase, e.g., $CO_2$. In such embodiments, the gas liquid separator 570 can also be in fluid communication with the second co-solvent source 542. In other embodiments, flow from the mixer 546 through the sample loop 562 can pass to a waste container.

When in the INJECT state, the first mixer 526 can deliver a mixture of mobile phase and a co-solvent through the sample loop 562 to the column 580, injecting the contents of the sample loop 562 onto the column 580. When in the INJECT state, flow from the second mixer 546 can be directed to the gas liquid separator 570 or to waste.

Figure 6:
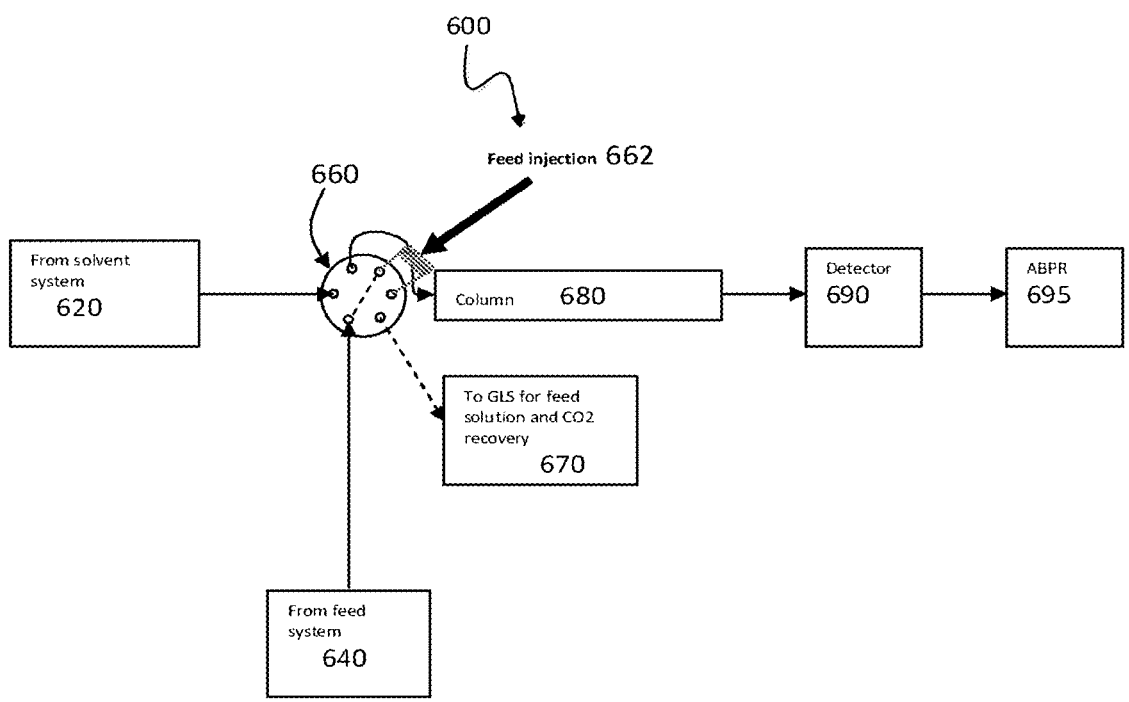
FIG. 6 schematically illustrates a generalize sample injection system according to an embodiment of the present technology.

To address possible precipitation issues resulting from solubility changes, a filtering system is introduced into the injection lines. In the embodiment shown in FIG. 5A, the filtering systems of the present technology are incorporated into second fluid delivery system 440. In the embodiment shown in FIG. 5B, the filtering systems of the present technology are incorporated into the flow passing into or out of second mixing connector 546. Either embodiment can be represented as shown as system 600 illustrated in FIG. 6. System 600 includes a main solvent flow line 620 and a feed flow line 640. The main solvent flow line 620 and feed flow line 640 include the same co-solvent and mobile phase materials. The feed flow line 640 also includes feed/sample material as well. System 600 further includes a valve 660 and a chromatography column 680. The valve 660 can include or be in fluid communication with a sample loop 662. Optional devices located downstream of the column include a detector 690 and a back pressure regulator (e.g., an active back pressure regulator) 695. In addition, a gas/liquid separator 670, or other recycling device can be position in communication with valve 660. The gas/liquid separator 670 (or other device, such as a valve or back pressure regulator) can be used to collect and/or recover a portion of the mobile phase and/or the feed material. In some embodiments, the recovered mobile phase and/or feed materials can be recycled. To reduce precipitates and increase solubility capabilities of a chromatography system including a decoupled injection or feed flow line 640 from a main solvent line 620, one or more filters/strainers can be incorporated into the feed flow line 640.

Figure 7:
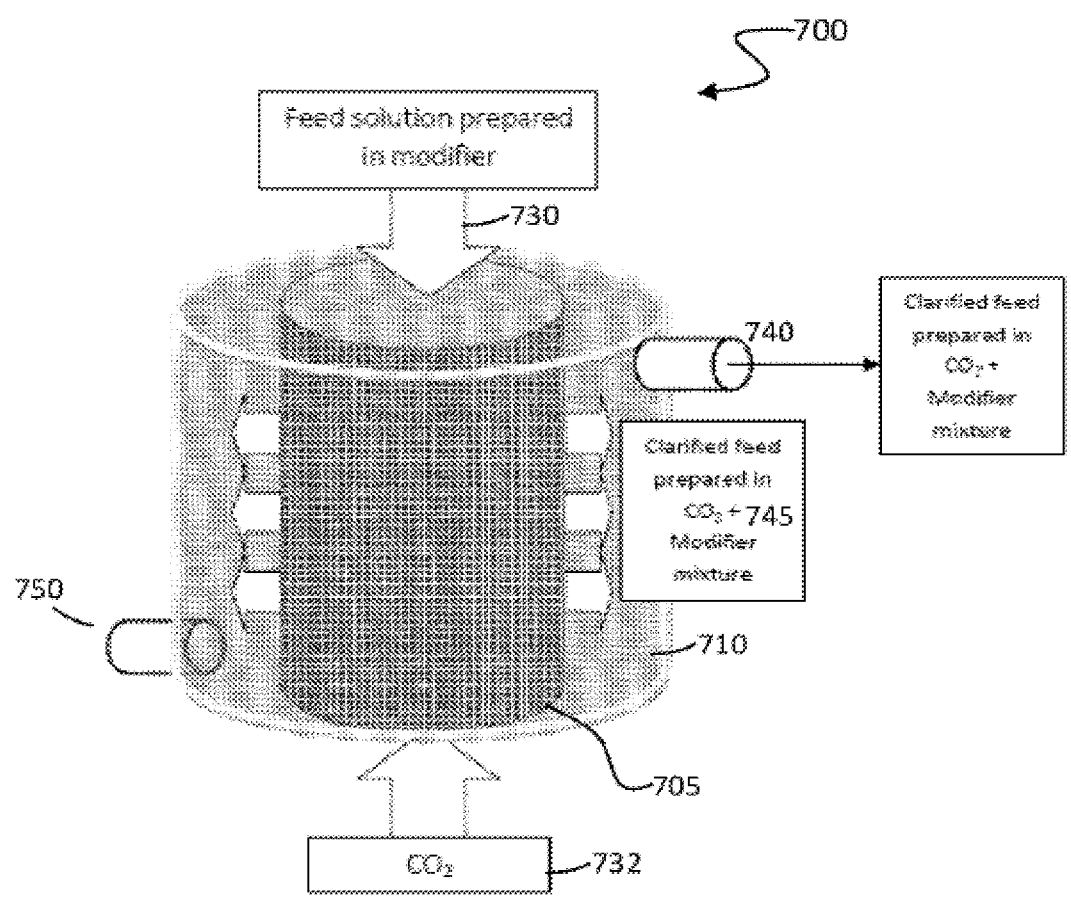
FIG. 7 schematically illustrates a strainer for a feed flow line according to an embodiment of the present technology.

Referring to FIG. 7, a strainer 700 is shown. Strainer 700 is formed, at least in part, by a filtration materials, such as, for example, a metallic or polymer based strainer. In particular a filter formed from porous or packed body or woven strains of stainless steel (e.g., 316SS or 316LSS), titanium, a nickel-based alloy (e.g., Hastelloy® nickel-based alloy available from Haynes International). Strainer 700 shown in FIG. 7, includes an inner vessel 705 having walls formed of the filtration material and an outer vessel 710. In one embodiment, the inner vessel 705 can be formed of a frit tube. Feed solution (i.e., sample mixed or contained in co-solvent) enters strainer 700 at a first inlet 730 and mobile phase (e.g., $CO_2$) enter strainer 700 at a second inlet 732. Within the inner vessel 705 the feed solution and mobile phase are mixed together. The walls of the inner vessel 705 (which are formed of a filtration material) prevent particulates from passing through to outer vessel 710. However, the wall of the inner vessel 705 allow the mixed feed solution in mobile phase to pass to the outer vessel 710. That is, the inner vessel 705 clarifies or filters the mixed solution (i.e., to create clarified feed prepared in $CO_2$ and modifier mixture 745), allowing a precipitate-free or substantially precipitate-free fluid to be delivered to valve 660 for injection into the chromatography column 680 (see FIG. 6), e.g., through outlet 740. Strainer 700 is also shown with outlet 750 which may communicate with a feed solution reservoir.

In the embodiment illustrated in FIG. 7, the strainer 700 not only filters but also mixes the mobile phase material with the feed solution (feed material in co-solvent). An exemplary way to incorporate strainer 700 into the systems shown in FIGS. 5A and 5B is to replace mixer 446 (for system 400) and mixer 546 (for system 500) with strainer 700. That is, the mixer and strainer are an integral device. In other embodiments, the mixers (such as mixers 446 or 546) are included as separate devices from a strainer. In these embodiments, the mixers are located upstream of the strainers (e.g., strainer 700 is located between mixer 446 and valve 460), and instead of having two inlets (one for the feed solution and one for the mobile phase), the mixed mobile phase and feed solution is delivered to the inner vessel 705 of the strainer 700.

By incorporating a filter, such as strainer 700, into chromatography systems which have a decoupled injection system from a main solvent line, an expected increase in solubility and as a result operating conditions can be achieved. That is, by incorporating the filter into a decoupled injection system, a bigger range of feed concentration can be incorporated for use in any method of operation of this system without decreasing efficiency. For example, as the system has a decoupled main solvent line and feed line, the incorporation of additional components such as a filter, does not result in an increase in extra-column band broadening. Further, by incorporating the filter into the feed line, an increase in concentration of the feed solution can be used without concern over crashing the system due to the build-up or presence of precipitates within the system.

An optional feature which can be incorporated into any chromatography system including strainer 700, is a strainer monitoring system. The strainer monitoring system would monitor system conditions through the strainer 700 (e.g., at least one of flow, pressure, or turbidity) to detect a clog or potential clogging therein. For example, the strainer monitoring system, in one embodiment, includes a pressure monitor within the strainer (e.g. within the inner vessel 705). An unexpected increase in pressure indicates that the walls of the inner vessel are clogged from precipitates. A pressure monitor can also be placed after the co-solvent pump in the feed line 640. Any unexpected rise in pressure of the co-solvent pump in the feed line 640 can also indicate the presence of a clog in the strainer or a clogging event. In another embodiment, the strainer monitoring system includes a turbidity check mechanism to detect clogging.

When a clogging event or a potential clogging event has been detected, systems and methods of the present technology can be activated to maintain operation of the system. In conventional systems, the presence of particulates clogged systems, requiring system shut down. By using systems and methods of the present technology, the detection of a clogging event or increased particulate matter doesn't lead to an automatic system shut down. Rather than shutting down the system, a detection of a clog or a system parameter indicating that a clog is possible in the present technology can trigger an alarm so that either by an operator or automatedly, the system switches to a by-pass flow path.

Figure 8:
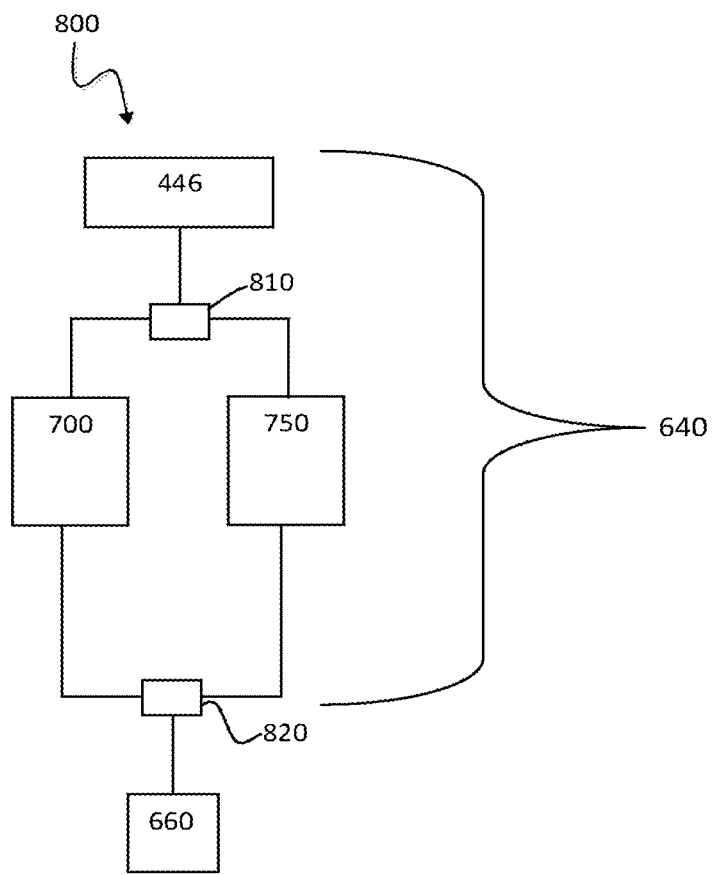
FIG. 8 schematically illustrates a by-pass flow system for use in a feed flow line according to an embodiment of the present technology.

Referring to FIG. 8, a by-pass flow system 800 includes strainer 700, a second strainer 750, and a set of valves 810 and 820. Flow passing through the feed flow line 640, from the second connector or mixer 446 to valve 660, in a first instance passes through mixer 700. That is, the valves 810 and 820 are positioned such that flow does not go through or into the flow path containing second strainer 750. Upon the detection of a clogging event or conditions which may lead to a clogging event, valves 810 and 820 are activated such that strainer 700 is taken off line and the second strainer 750 is activated. While FIG. 8 illustrates a by-pass flow system including two strainers, there is no limit to the number of strainers which could be included. That is, for example, a third strainer could also be included for when a clog is detected in the second strainer 750.

In addition to by-pass flow systems, the present technology can include regeneration systems. A regeneration system can regenerate a strainer. That is, a regeneration system can flush out a clog within a strainer (e.g., regenerate the inner filter walls) such that it can be placed back into service. Certain regeneration systems can also include a feed recycling component. In general, clogs are created due to feed material precipitating out of solution. As a result, there is a loss of sample source. Regeneration systems of the present technology can be implemented to dilute the precipitates and recycle the material back to a feed solution source.

Figures 9A, 9B:
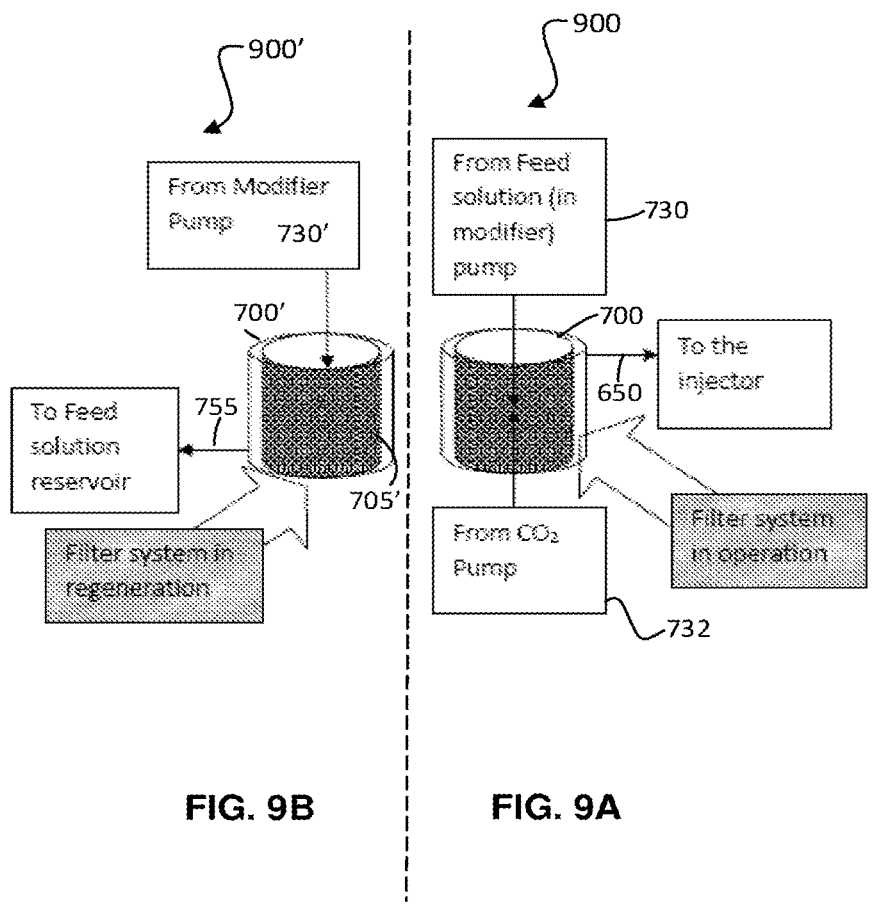
FIGS. 9A and 9B schematically illustrate a regeneration system for a strainer in a feed flow line according to an embodiment of the present technology.

FIGS. 9A and 9B show a regeneration system 900 that includes additional flow paths and corresponding valves to regenerate a filter/strainer. FIGS. 9A and 9B schematically illustrate two modes of operation. In FIG. 9A strainer 700 is shown in normal or filtering operation. That is, feed solution enters strainer 700 through a first inlet 730 and $CO_2$ enters the strainer through a second inlet 732. The fluids are mixed together within strainer 700 and any precipitates are filter out (or mostly filtered out) before passing into a flow path 650 leading to the injector valve 660.

In FIG. 9B, shows the system 900' in regeneration mode. Instead of feed solution entering through first inlet 730, a valve is switched such that pure modifier fluid (e.g., co-solvent without feed solution) is delivered to strainer 700'. The pure modifier or co-solvent fluid enters at 740. Precipitates located on walls 705' of the strainer 700' are dissolved and flow to a feed solution reservoir through outlet 755 for recycling.

Figures 10A, 10B:
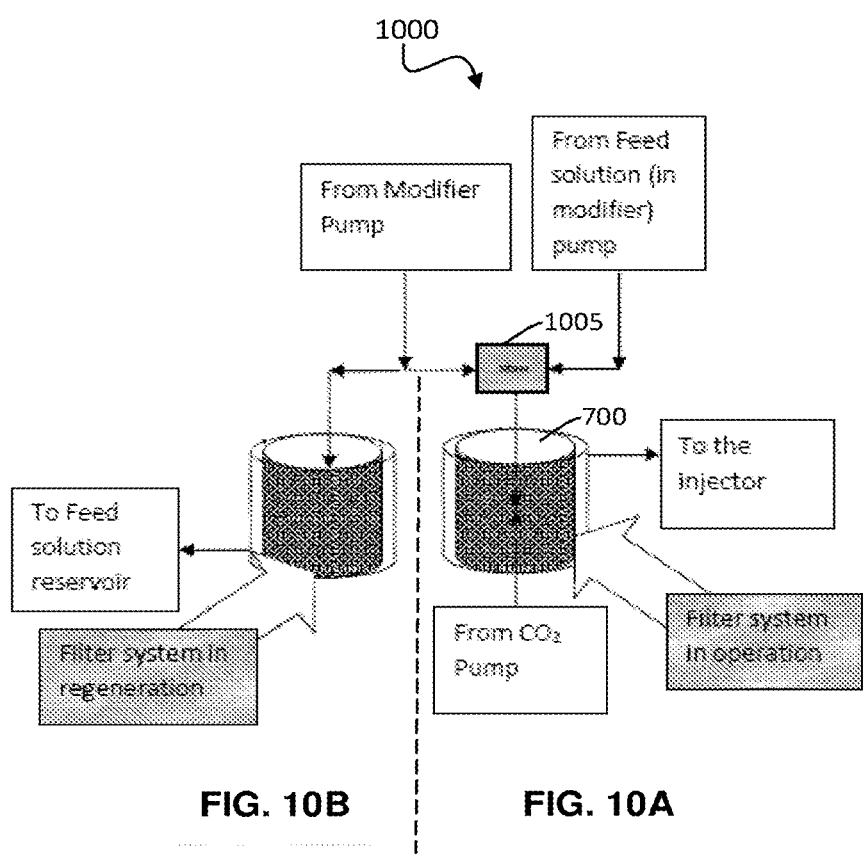
FIGS. 10A and 10B schematically illustrate another regeneration system according to an embodiment of the present technology.

In another embodiment shown in FIGS. 10A and 10B, flow lines can be plumbed such that a mixer 1005 can be incorporated into a regeneration system 1000. In system 1000, feed solution (in modifier or pure) can be delivered to mixer 1005. Pure modifier can also be delivered to mixer 1005. Mixer 1005 includes valves such that both feed solution and modifier solution can both be delivered to mixer 1005 at the same time or an operator can select to have just one of the fluids delivered to mixer 1005. In this way, the mixer 1005 can be utilized as a valve itself for changing between modes of operation, i.e., between filter operation and regeneration operation.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A chromatography system comprising:
a first co-solvent source in fluid communication with a first mixer;
a second co-solvent source and a sample source in fluid communication with a second mixer;
a mobile phase source configured to provide mobile phase to the first and second mixers;
a strainer to minimize precipitation of sample in mobile phase;
a sample loop positioned downstream and in fluid communication with the strainer;
a chromatography column; and
a valve, the valve having a plurality of discrete positions forming different fluidic connections including (i) a first position in which the first mixer is in fluid communication with the chromatography column and the second mixer is in fluid communication with the chromatography column.

2. The chromatography system claim 1, wherein the second co-solvent source and sample source are combined to form a feed solution.

3. The chromatography system of claim 2, further comprising a third mixer for diluting the feed solution with fluid from the first co-solvent source.

4. The chromatography system claim 1, wherein the mobile phase comprises $CO_2$.

5. The chromatography system claim 4, wherein the inner vessel is a frit tube.

6. The chromatography system claim 1, wherein the strainer comprises an inner vessel and an outer vessel, the inner vessel formed of a filtration material to decrease the flow of particulate movement to the outer cylinder.

7. The chromatography system claim 1, wherein the second mixer and strainer are an integral device.

8. The chromatography system claim 1 further comprising a strainer monitoring system to detect clogging therein.

9. The chromatography system claim 8, wherein the strainer monitoring system comprises a turbidity check mechanism.

10. The chromatography system claim 8, wherein the strainer monitoring system comprises a pressure monitor.

11. The chromatography system claim 8, further comprising a by-pass line including a back-up strainer to allow filtering to continue after the strainer monitoring system detects clogging.

12. The chromatography system of claim 1, further comprising a strainer regeneration system to wash off and recycle sample clogging the strainer.

* * * * *